(Model.)

W. S. SHIPE.
CHAIN SAW.

No. 323,602. Patented Aug. 4, 1885.

WITNESSES:
C. Neveux
C. Sedgwick

INVENTOR:
W. S. Shipe
BY Munn & Co
ATTORNEYS.

UNITED STATES PATENT OFFICE.

WALTER S. SHIPE, OF MINERVA, OHIO.

CHAIN-SAW.

SPECIFICATION forming part of Letters Patent No. 323,602, dated August 4, 1885.

Application filed March 18, 1885. (Model.)

*To all whom it may concern:*

Be it known that I, WALTER S. SHIPE, of Minerva, in the county of Stark and State of Ohio, have invented certain new and useful Improvements in Chain-Saws for Felling Trees and other Purposes, of which the following is a full, clear, and exact description.

This invention is more particularly designed for felling trees and cutting logs by horse or other power; and it consists in a chain-saw of novel construction, substantially as hereinafter described, and which saw in its application to felling trees or cutting logs is started by placing its front end partially around the tree or log, and the work completed by drawing the chain over the timber. Among the leading peculiarities and advantages of this invention is, that each link of the chain is made to displace the whole chip, instead of depending upon succeeding links to do so, and to effect the ready clearance of the cut chips; and this the invention provides for being done by a single cutter of peculiar construction applied to each link, said bit or cutter of each link removing the chip the full width of the kerf, and thus doing away with the necessity of a series of cutters applied to each succeeding pair of links, as in a former invention of mine.

Reference is to be had to the accompanying drawings, forming part of this specification, in which similar letters of reference indicate corresponding parts in all the figures.

Figure 1:
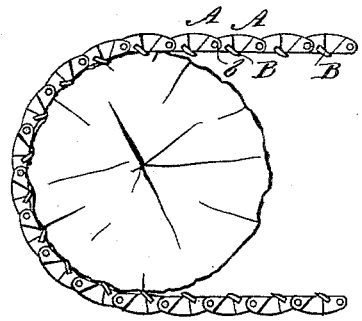
Figure 2:
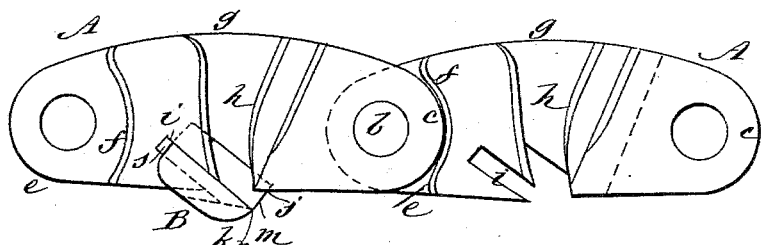
Figure 3:
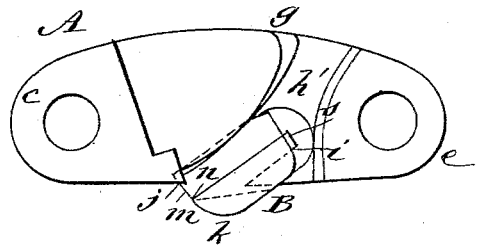
Figure 4:
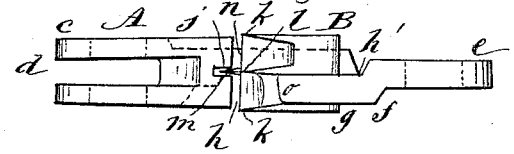
Figure 5:
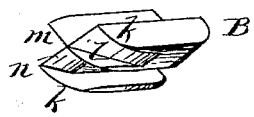

Figure 1 represents a plan view upon a reduced scale of a chain-saw in part embodying my invention, applied to cutting or felling a tree. Fig. 2 is a side view of two connected links of the chain, with a cutter only applied to the one of them; Fig. 3, a reverse side view of one of the links with its attached cutter, and Fig. 4 a front cutting-edge view thereof. Fig. 5 is a perspective view of one of the cutters detached.

A A are the links of the chain, which are riveted or united by screws or otherwise, as at $b$, to each other, to form a chain of any desired length. The front end, $c$, of each link is slotted, as at $d$, to receive the tongue $e$ at the rear end of the succeeding link, said tongue and groove or slot being centrally in the plane of the link, and being suitably shaped to fit snugly one within the other end, so as to bring the sides of all the links in the same line or plane with each other, and so that the links will swing freely on the rivets or screws which join them together until a shoulder or offset, $f$, on one side of each link comes in contact with the front slotted end, $c$, of the next link. This shoulder $f$, that is suitably shaped for the purpose, prevents the chain from shutting or swinging down on the bits or cutters.

To provide for the bit or cutter of each link removing a chip of the full width of the kerf, each link is made with an offset, as at $g$, in its center, leaving or forming recesses $h\ h'$ on opposite sides of the plane of the link, and the one in advance of the other, so that the chip, which is divided by the cutter longitudinally of its width, will escape from or pass by the link, the one part in front and the other part in rear of the offset, along or out through the recesses $h\ h'$. Each link is also slotted on or from its under side or edge crosswise and lengthwise, as at $i\ j$, to receive the bit or cutter B, which is made to fit said slots and to be held in place by them.

The bits or cutters B are each constructed or provided with four spurs or cutting-blades, $k\ k$, $l$, and $m$, transverse to the main or front cutting-edge, $n$, of the bit, three of said cutting-blades, $k\ k$ and $l$—that is, two side blades, $k\ k$, and one center one, $l$—being on the heel of the bit to separate and divide the chip longitudinally, and the remaining blade, $m$, being on the face of the bit, to assist in holding the bit in place and to direct the divided parts of the chip to their proper channels of escape. The several cutting-edges of the bits are arranged on the under side, and so as to project beyond the under or inner edges of the links, in order that they may be convenient for sharpening without removing the bits from the links.

Each bit B may be driven out as it wears, and be held to its proper place by inserting a piece of sheet metal or other packing, $s$, in the slot $i$ at the upper or back end of the bit, and by swaging the point of the link, as at $o$, in the back of the bit.

In the operation of this chain-saw it should be held at such an angle as will utilize all the available power. Ordinarily, arranging it about half-way around the tree or log will be suitable for one team of horses.

Having thus described my invention, what I claim as new, and desire to secure by Letters Patent, is—

1. A chain-saw link constructed with an offset located about centrally of its length, a recess upon one side of the link and in advance of the offset, and upon the opposite side of which link is a second recess having its lower end connecting with the lower end of the aforesaid recess, substantially as and for the purpose set forth.

2. A chain-saw link constructed with an offset, a recess upon one side of the link and in advance of the offset, and upon the opposite side of which link is a second recess having its lower end connecting with the lower end of the aforesaid recess, said recesses diverging from each other toward their upper ends, substantially as and for the purpose set forth.

3. In a chain-saw, the links A, pivoted together as described, and constructed with opposite tongue and slotted ends centrally in the plane of the links, and with a shoulder, $f$, at their one end, to prevent the chain from swinging or shutting down on the bits or cutters of the links, said shoulder forming an offset on one side of the link and curved upon its inner face, substantially as described.

4. The links A, provided on their under or inner edge with transverse slots $i\ j$, for the purpose of holding the bits or cutters, essentially as specified.

5. The chain-saw link provided with the transverse slots, in combination with the bit B, constructed with spurs or cutting-blades $k$ $k\ l$ on its heel, and a front central spur, $m$, on its face, all transverse to the cutting-edge $n$ of the bit, substantially as shown and described.

6. In combination with the links A, having slots $i$, and the bits B, constructed to fit said slots, the packings $s$, for blocking out said bits as they wear, substantially as described.

WALTER S. SHIPE.

Witnesses:
JOHN G. SLACK,
ROBERT RUE.